Dec. 26, 1933.                A. S. KNAPP                1,940,755
                               IRON HANDLE
                            Filed May 6, 1931

INVENTOR
Andrew S. Knapp
BY HIS ATTORNEY

Patented Dec. 26, 1933

1,940,755

UNITED STATES PATENT OFFICE 1,940,755

IRON HANDLE

Andrew S. Knapp, St. Louis, Mo., assignor to Knapp-Monarch Company, Belleville, Ill., a corporation of Missouri Application May 6, 1931. Serial No. 535,413

3 Claims. (Cl. 68—26)

REISSUED

The present invention relates to pressing irons and more particularly to an improved handle whereby the iron may be manipulated in use.

The present handle of a pressing iron, especially of the electric household type, oftentimes become so hot as to blister or burn the hand of the user and, in any event, they retain the heat communicated thereto from the support for the handle so that the handle becomes uncomfortably hot soon after commencing its use. Furthermore, the handle is made of some substance such as wood, molded bakelite, etc., which is unyielding to the grip and hard to the touch and the skin, frequently causing callouses or other blemishes that are painful or unsightly. In addition, such handles are tiring to the hand of the user.

It is one object of this invention to provide a new and improved handle that will overcome the foregoing objections.

It is another object of this invention to provide a handle having a resilient but firm hand grip.

It is a further object of this invention to provide a pressing iron with ventilated handle.

It is a still further object of this invention to provide a pressing iron with a handle having an insulated handle grip.

It is still another object of this invention to provide an efficient and easy means and method of assembly of the parts comprising a handle of the above indicated character.

In carrying out this invention a resilient rubber sleeve is mounted upon a shaped wooden or molded holder or handle, the holder having an enlarged head at each end thereof. The heads are slotted so as to receive the upright ends of a metal bracket, which is secured to the pressing iron base. It is of importance that the rubber sleeve be of substantial thickness and that the holder (between the heads thereof) be bowed outwardly in the center thereof so as to fill and fit the hollow of the closed hand, when covered with the rubber sleeve, to thus provide a convenient and comfortable grip for the fingers and hand of the user. The rigidity of the holder in back of the resilient sleeve insures a firm but soft grip for the pressing iron, and the heads prevent the spreading of the tube. It is also of importance that the rubber sleeve be insulated from the metal bracket so as not to injure the rubber and insure a grip that is at all times cool to the touch.

This invention will be best understood from the following specification taken in conjunction with the accompanying drawing, wherein—

Figure 1:
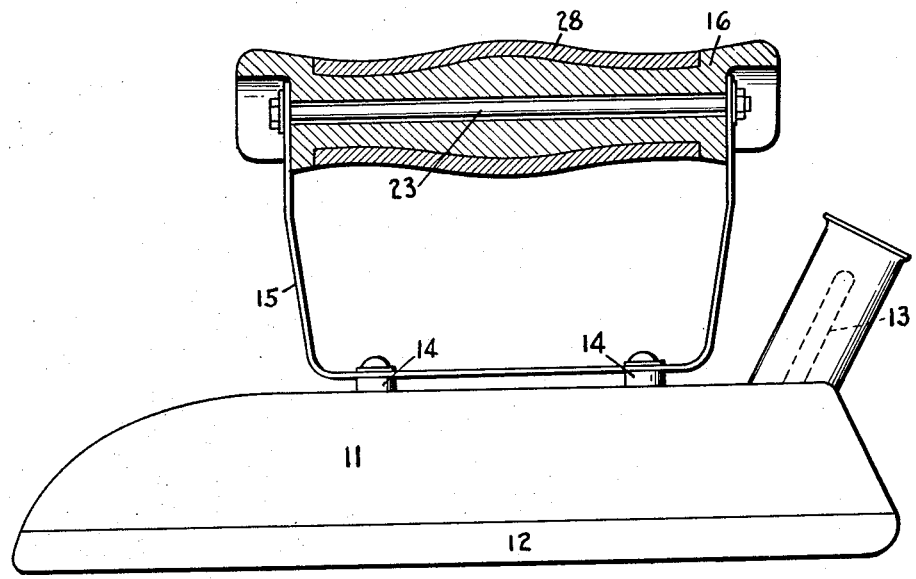
Figure 1 is a side elevation, with parts broken away and sectioned, of a pressing iron provided with the improved handle.

Referring to the drawing, an electric pressing iron is shown in Figure 1. It comprises a base 11 having a pressing or sole plate 12, an electric heating element (not shown) being mounted in the base in back of the sole plate in the customary manner. A pair of terminals 13 are provided for convenient connection of the iron to a source of power supply.

The base 11 has on top thereof a pair of bosses 14 to which is secured a flat, U-shaped bracket 15, the legs thereof projecting upwardly and forming a pair of uprights. A hollow handle 16 is mounted between the uprights.

Figure 2:
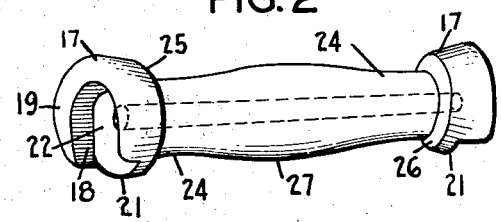
Fig. 2 is a perspective view of the handle or holder.

The handle 16 has a pair of heads 17 at each end respectively. Each head has therein an indentation or depression 18 which extends upwardly from the bottom 19 and also inwardly from the face 21 thereof. As indicated in Fig. 2, the indentation is arch shaped and has a flat rear wall 22 against which the flat surface of the leg of the bracket 15 rests, the end of each leg being shaped to fit the indentation 18. A bolt 23 extends through the handle and through the legs of the bracket 15 so as to secure these parts fast together.

Between the two heads 17 is a reduced body portion 24 which forms shoulders 25 and 26 where the respective heads are joined to the body 24. The body 24 is bowed outwardly at the center thereof as shown at 27 being shaped so as to fit comfortably into the grip of the hand.

A soft rubber tube 28 is fitted upon the holder 16, as will be explained hereinafter, to constitute a hand grip. The tube 28 fits between the shoulders 25 and 26 which are of the same depth as the thickness of the rubber tube. The tube is of the same thickness throughout its length and rests upon the reduced portion 27 conforming to the shape thereof. Accordingly, this arrangement provides an assembled handle presenting a resilient hand grip 28 that is firmly supported by the shaped body 24 and that is prevented from spreading by the shoulders 25, 26. It will also be noted that the rubber hand grip 28 is insulated from the legs of the bracket 15 by the construction described.

Figure 3:
Fig. 3 is a perspective view of the rubber tube that is assembled upon the handle, showing a modified form.

The surface of the tube 28 may be plain, as illustrated in Fig. 1, or provided with a plurality of grooves 31 as shown in Fig. 3. The purpose of the grooved surface is to permit the circulation of air about the surface, thereby keeping the hand grip cooler than where merely a plain surface is provided. Any other form of surface may be provided which leaves grooves, or other interstices accomplishing the object sought.

It is apparent that the above described invention provides the pressing iron with a handle that is soft, but firm, that will be continually cool to the touch, and untiring to the user.

The method of assembly of the handle is of importance since the holder 16 has an enlarged head at each end. For this purpose, there is provided a very simple tool 32 shown in Fig. 5. It comprises a tapered body 33, the widest part of the body being the same diameter as the head 17. On the back of the body 33 is a projection 34 which is of the same shape and size as and to fit into the indentation 18. Extending outwardly from the projection 34 is a centering pin 35 intended to be received in the end of the bolt hole 36. To assemble the tube 28 on the holder 16, the tool is inserted in one of the heads 17 with the pin 35 and projection 34 in the hole 36 and indentation 18 respectively, so that the bottom of the body 33 is next to the face 19 of head 17. The projection 34 being the same shape as the indentation will prevent the tool from slipping or turning. The tube 28 is then pushed onto the tapered body 33 which gradually expands the tube until it readily passes over the head 17. The tube 28 then is easily fitted into place on the body 24 as shown in Fig. 1.

Figures 4, 5, 6:
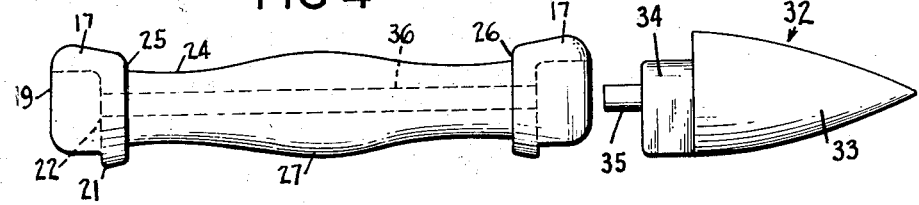
Figs. 4, 5 and 6 illustrate the method of assembly being respectively side elevations of the holder, the assembly tool and a fragmentary view of the rubber tube.
Figures 7, 8:
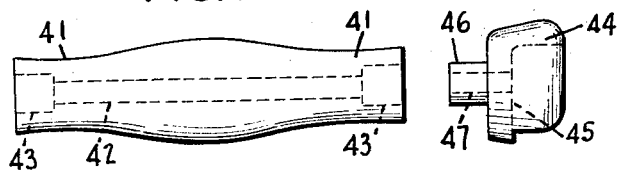
Figs. 7 and 8 are side elevations of the parts of a modified form of handle or holder.

Figs. 7 and 8 illustrate a modified form of handle or holder 16. In the other figures of the drawing the holder is shown as one piece, which may be either turned out of wood, or moulded out of bakelite or other composition. In Fig. 7 the shaped body member 41, corresponding to the reduced body portion 24, of Fig. 4, is a separate piece having a central hole 42 extending therethrough. In each end of body member 41 is a bore 43. The heads, one of which is shown at 44, correspond to the heads 17, but are separate pieces. Each head is provided with an indentation 45 corresponding to indentation 18. It also has a projection 46 on the rear face thereof adapted to fit into the bore 43. A central hole 47 registers with the hole 42 to provide passage for a bolt. With this form of construction the tube 28 would be fitted directly upon the member 41 without a tool and the heads 44 would be pressed and secured in place afterwards.

Modifications may be made in the arrangement and location of parts within the spirit and scope of my invention, and such modifications are intended to be covered by the appended claims.

I claim:

1. A pressing iron comprising an ironing base, a support carried thereby, a handle mounted upon said support, a resilient hand grip imbedded in said handle, and continuous, spirally arranged protuberances on the outer surface of the hand grip for ventilating purposes.

2. A handle construction for an appliance provided with heating means comprising a support carried by said appliance, a handle element mounted upon said support, a resilient hand grip imbedded in said handle element and continuous, spirally arranged protuberances on the outer surface of the hand grip for ventilating purposes.

3. A handle construction for an appliance provided with heating means comprising a support carried by said appliance, a handle element mounted upon said support, a tubular resilient hand grip having said handle element received therein and continuous, spirally arranged protuberances on the outer surface of the hand grip for ventilating purposes.

ANDREW S. KNAPP.